United States Patent
Lu et al.

(10) Patent No.: US 7,319,749 B2
(45) Date of Patent: Jan. 15, 2008

(54) HINGE WITH ORTHOGONAL PIVOT AXES

(75) Inventors: Sheng-Nan Lu, Shulin (TW);
Hsiang-Chi Chien, Shulin (TW)

(73) Assignee: Shin Zu Shing Co., Ltd. (TW)

( * ) Notice: Subject to any disclaimer, the term of this patent is extended or adjusted under 35 U.S.C. 154(b) by 715 days.

(21) Appl. No.: 10/910,567

(22) Filed: Aug. 4, 2004

(65) Prior Publication Data

US 2006/0029218 A1 Feb. 9, 2006

(51) Int. Cl.
*H04M 9/00* (2006.01)
*H04M 1/00* (2006.01)
*E05D 11/10* (2006.01)
*E05C 17/64* (2006.01)

(52) U.S. Cl. .............................. 379/433.13; 379/433.11; 16/340; 16/330; 16/367

(58) Field of Classification Search ............ 379/433.13, 379/433.11; 455/575.3, 575.1; 16/340, 16/330, 367; 248/917, 928, 284.1
See application file for complete search history.

(56) References Cited

U.S. PATENT DOCUMENTS 6,427,288 B1 * 8/2002 Saito ............................. 16/361
7,017,235 B2 * 3/2006 Lu et al. ........................ 16/367
7,082,642 B2 * 8/2006 Su ................................. 16/340
2006/0185126 A1 * 8/2006 Su ................................. 16/340
2006/0200945 A1 * 9/2006 Lu et al. ........................ 16/340

* cited by examiner

*Primary Examiner*—Curtis Kuntz
*Assistant Examiner*—Phylesha L Dabney
(74) *Attorney, Agent, or Firm*—Fei-Fei Chao; Andrews Kurth LLP (57) ABSTRACT

The hinge with orthogonal pivot axes can be used with a cellular phone having a cover and a base and has a tilt hinge, an offset hinge and a turning hinge. The tilt, offset and turning hinges respectively comprise a rotating positioning element and a stationary positioning element. The rotating positioning elements of the tilt and offset hinges have protrusions corresponding to and simultaneously engaging detents in the stationary positioning element when the tilt and offset hinges are closed and opened. The rotating positioning element of the turning hinge has protruding limits formed on the rotating positioning element selectively abutting the positive stop on the stationary positioning element of the turning hinge when the turning hinge is rotated.

6 Claims, 8 Drawing Sheets

HINGE WITH ORTHOGONAL PIVOT AXES

BACKGROUND OF THE INVENTION

1. Field of the Invention

The present invention relates to a hinge, especially to a hinge with orthogonal pivot axes.

2. Description of the Prior Art

As cellular phones are more widely used, competition in the cellular phone industry, emergence of wireless Internet technology and the growth of digital photographic techniques have caused quantum jumps in the development of cellular phone capabilities. In the late 1970's and early to mid 1980's, relatively large cellular phones were used only to make or receive phone calls. Significant miniaturization of electronic devices in the late 1980's and early 1990's led to cellular phones getting significantly smaller. The turn of the century saw the proliferation of wireless Internet access through home computer installations and cellular phones. Today, digital cameras are imbedded in cellular phones that can transmit the digital pictures to other cellular phones or e-mail addresses. With the growth of the capabilities of the cellular phone, the cellular phone display has evolved from monochrome LED and liquid crystal displays to brilliant full-color displays today. Cellular phones with digital cameras and full-color displays are so common today that a person could reasonably anticipate that such cellular phones will be industry standards in the not too distant future.

Cellular phones generally are foldable or not foldable. A foldable cellular phone has a cover, a base and a hinge. The hinge is mounted between the cover and the base. A conventional hinge only allows the cover to pivot open or closed. The cover has an inside surface, an outside surface, a display and on optional camera lens. The display is on the inside surface, and when the cellular phone is equipped with a digital camera, the camera lens is mounted on the outside surface. The base has a front surface and a keyboard. The front surface faces the inside surface of the cover, and the keyboard is mounted on the front surface of the base. A person accesses the keyboard on the front surface of the base to take pictures through the lens. However, the user has to point the lens at himself when he wants to take his own picture. In this situation, accessing the keyboard is difficult, at best.

To overcome the shortcomings, the present invention provides a hinge with orthogonal pivot axes to mitigate or obviate the aforementioned problems.

SUMMARY OF THE INVENTION

The main objective of the present invention is to provide a hinge with orthogonal pivot axes that will allow a cover attached to the hinge to be turned to virtually any viewing angle.

The hinge with orthogonal pivot axes in accordance with the present invention for a cellular phone with a cover and a base has a tilt hinge, an offset hinge and a turning hinge. Each of the tilt, offset and turning hinges comprises a rotating positioning element and a stationary positioning element. The rotating positioning elements of the tilt and offset hinges have protrusions corresponding to and simultaneously engaging detents in the stationary positioning element when the tilt and offset hinges are closed and opened. The rotating positioning element of the turning hinge has protruding limits formed on the edge of the rotating positioning element of the turning hinge selectively abutting the positive stop on the stationary positioning element of the turning hinge when the turning hinge is rotated.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
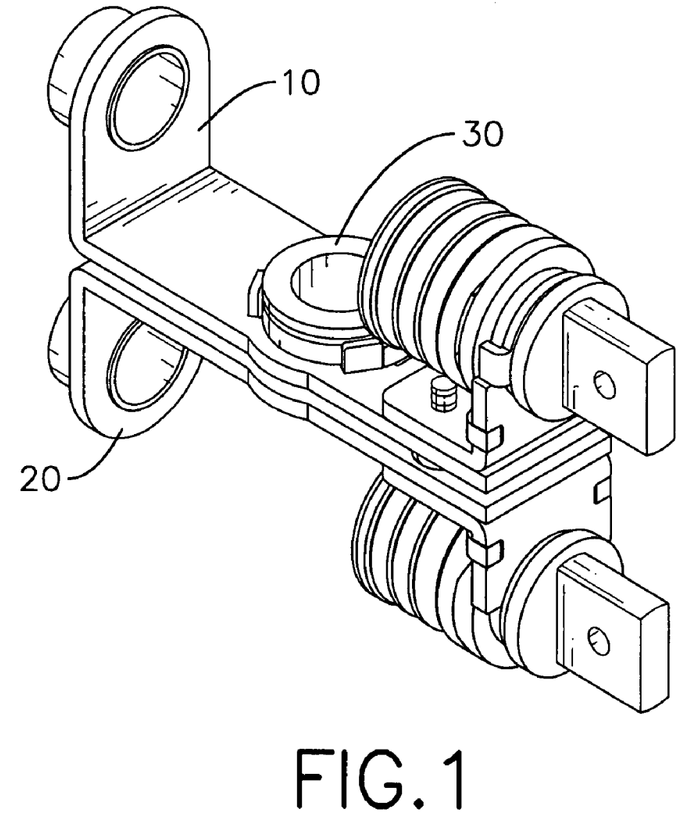
FIG. 1 is a perspective view of a hinge with orthogonal pivot axes in accordance with the present invention.
Figure 2:
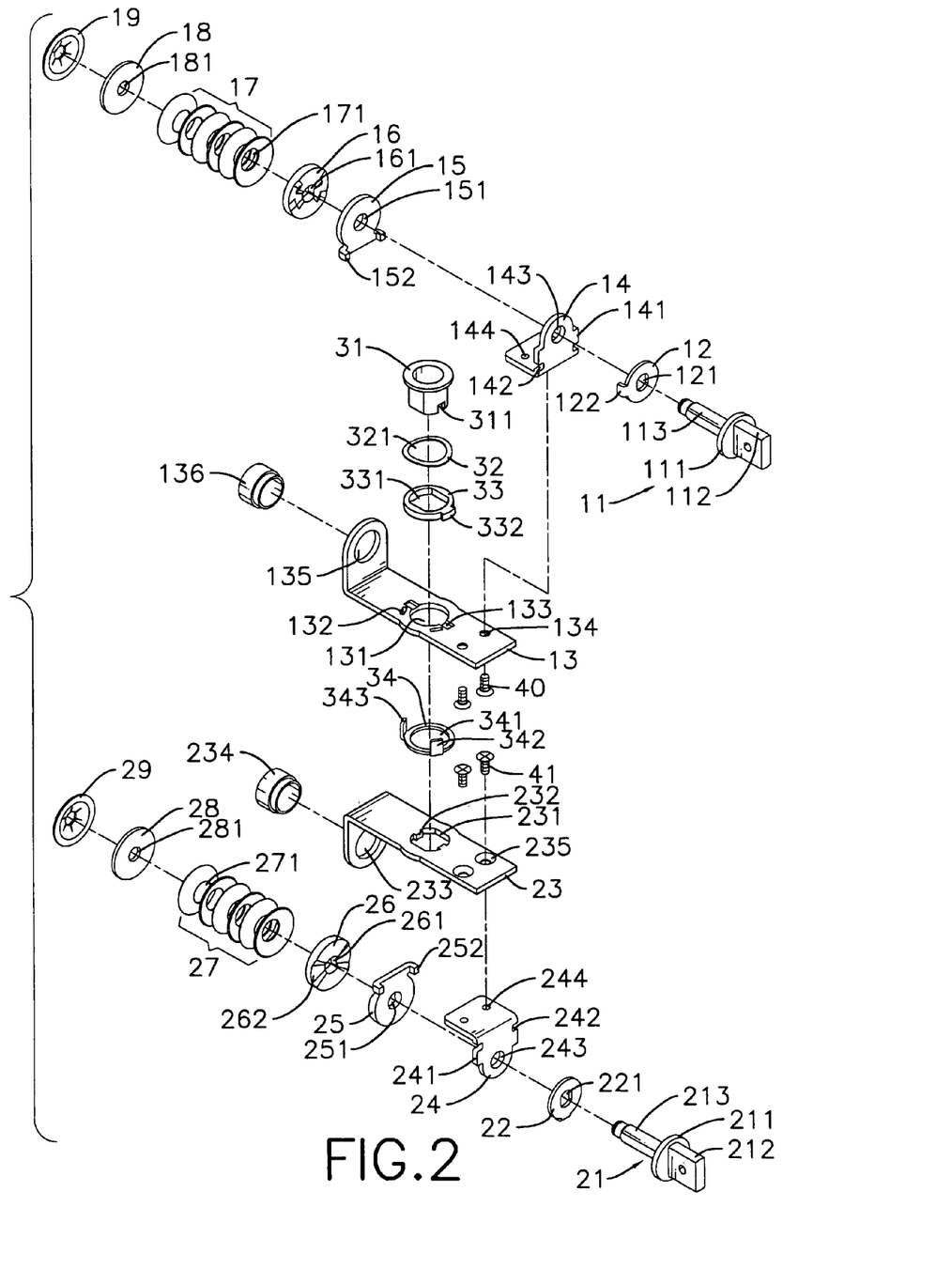
FIG. 2 is an exploded perspective view of the hinge in FIG. 1.
Figure 6:
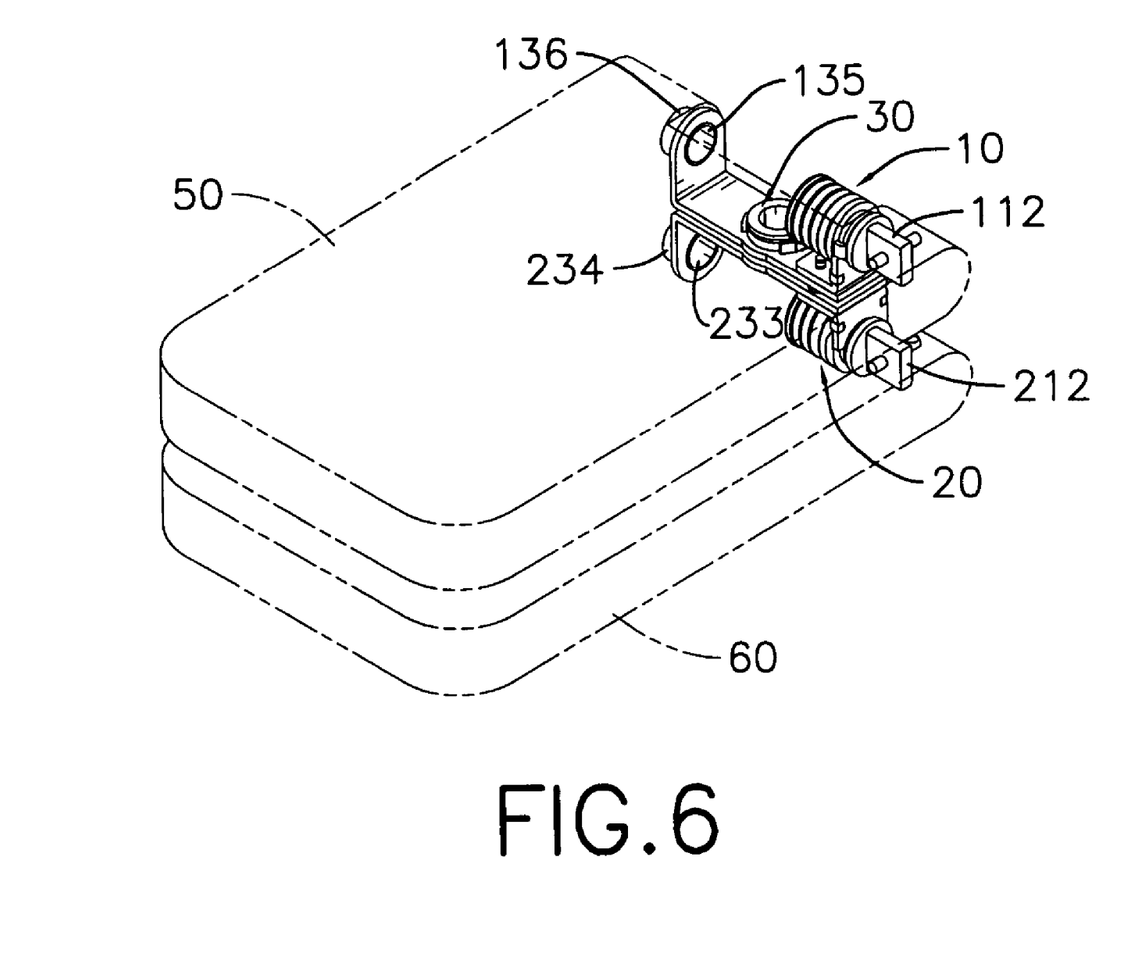
FIG. 6 is a perspective view of the hinge in FIG. 1 mounted in a cellular phone with a cover and a base.

With reference to FIGS. 1, 2 and 6, a hinge with orthogonal pivot axes can be used with a cellular phone having a cover (50) and a base (60) to pivotally attach the cover (50) to the base (60) and has a tilt hinge (10), an offset hinge (20), a turning hinge (30) and optional fasteners (40, 41). The cover (50) has a display and an outside surface, and base (60) has a keyboard and a bottom surface.

The tilt hinge (10) is mounted in the cover (50), is used to open and close the cover (50) and comprises a keyed pivot pin (11), an optional limit disk (12), a pivot pin bracket (14), a tilt hinge bracket (13), a rotating positioning element (15), a stationary positioning element (16), a biasing assembly (17), an optional washer (18) and a fastener (19).

The keyed pivot pin (11) is mounted in the cover (50) and has an outside end, an inside end, a head (112), a combination shaft (113) and a flange (111). The head (112) is formed on the outside end. The combination shaft (113) is formed on the inside end and coaxially with the head (112). The flange (111) is formed between the head (112) and the combination shaft (113).

The limit disk (12) is mounted around the combination shaft (113), abuts the flange (111) and has an outer edge, a central keyhole (121) and a positive stop (122). The positive stop (122) is formed on the outer edge.

The pivot pin bracket (14) is L-shaped, is mounted around the combination shaft (111), abuts the limit disk (12) and has a transverse leg, a longitudinal leg, two optional positive stops (141), two optional notches (142), a central circular hole (143) and two optional fastening holes (144). The transverse leg has an outer edge. The positive stops (141) are formed on the outer edge of the transverse leg diametrically opposite to each other, and abut the positive stop (122) on the limit disk (12) to keep the keyed pivot pin (11) from pivoting further. The notches (142) are formed between the positive stops (141) and the longitudinal leg. The central circular hole (143) is formed in the transverse leg. The fastening holes (144) are formed in the longitudinal leg.

The tilt hinge bracket (13) is L-shaped, is attached to the pivot pin bracket (14) and has a longitudinal leg, a transverse leg, a through hole (131), two keyholes (132), two detents (133), two optional fastening holes (134), a mounting hole (135) and a rotating element (136). The longitudinal leg has an inside surface and an outside surface. The through hole (131) is formed in the longitudinal leg. The keyholes (132) are formed around the through hole (131). The detents (133) are formed diametrically opposite to each other in the inside surface of the longitudinal leg around the through hole (131). The fastening holes (134) are formed in the longitudinal leg so the fastening elements (40) can pass through the fastening holes (134, 144) and attach the tilt hinge bracket (13) to the pivot pin bracket (14). The mounting hole (135) is formed in the transverse leg. The rotating element (136) is mounted in the mounting hole (135) and is mounted rotatably in the cover (50).

Figure 4:
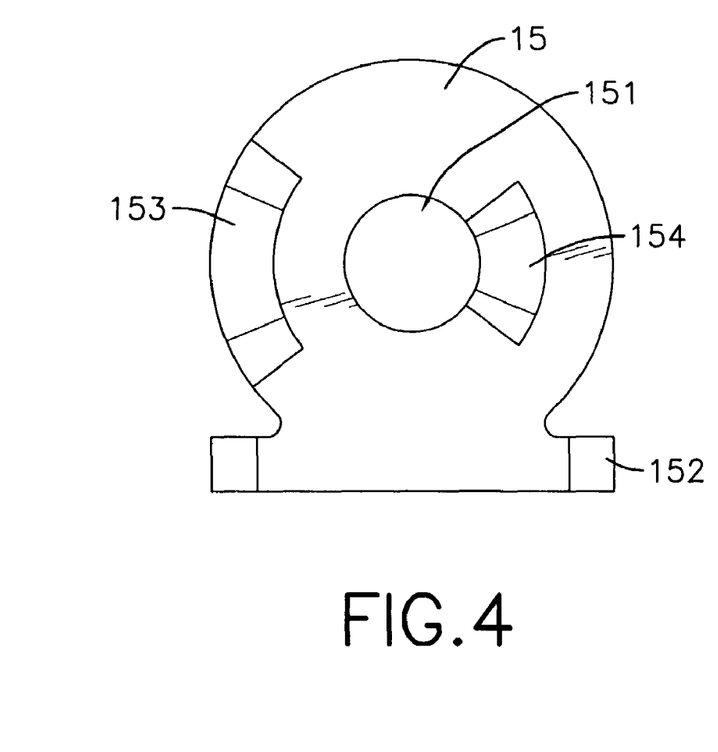
FIG. 4 is a side view of a rotating positioning element of the hinge in FIG. 1.

With further reference to FIG. 4, the rotating positioning element (15) is mounted rotatably around the combination shaft (113), abuts the transverse leg of the pivot pin bracket (14) and has an outer edge, an outside surface, an inside surface, a central circular hole (151), two optional mounting tabs (152), a first protrusion (153) and a second protrusion (154). The outside surface abuts the transverse leg of the pivot pin bracket (14). The central circular hole (151) has a center. The mounting tabs (152) are formed on the outer edge of the rotating positioning element (15) and correspond to and are mounted respectively in the notches (142). The first and second protrusions (153, 154) are formed concentrically on the inside surface around the central circular hole (151) and are not symmetrical with each other. Each of the first and second protrusions (153, 154) has two inclined ends. The first and second protrusions (153, 154) have respectively a distance from the center of the central circular hole (151). The distance between the first protrusion (153) and the center of the central circular hole (151) is different from the distance between the second protrusion (154) and the center of the central circular hole (151).

Figure 5:
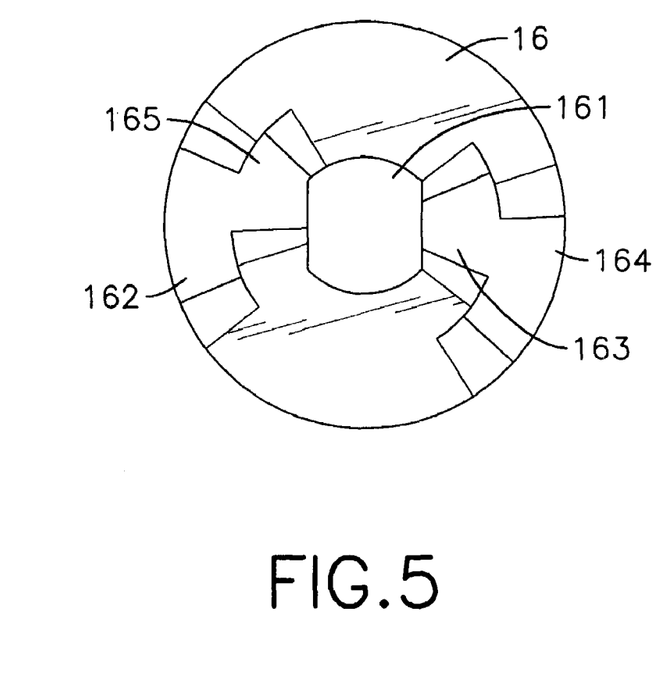
FIG. 5 is a side view of a stationary positioning element of the hinge in FIG. 1.

With further reference to FIG. 5, the stationary positioning element (16) is mounted on the combination shaft (113), abuts the inside surface of the rotating positioning element (15) and has an inside surface, an outside surface, a central keyed hole (161), a first detent (162), a second detent (163), a third detent (164) and a forth detent (165). The first, second, third and forth detents (161, 162, 163, 164) are formed around the central keyed hole (161). The first and third detents (162, 164) selectively correspond to the first protrusion (153) on the rotating positioning element (15). The second and forth detents (163, 165) selectively correspond to the second protrusion (154) on the rotating positioning element (15). The first and second detents (162, 163) are formed to simultaneously engage the first and second protrusions (153, 154) when the cover (50) is open. The third and forth detents (164, 165) are formed to simultaneously engage the first and second protrusions (153, 154) when the cover (50) is closed.

The biasing assembly (17) is mounted rotatably around the combination shaft (113), abuts the outside surface of the stationary positioning element (16) and has a central hole (171).

The washer (18) is mounted around the combination shaft (113), abuts the biasing assembly (17) and has a central hole (181).

The fastener (19) is attached to the combination shaft (113), sequentially holds the washer (18), the biasing member (17), the stationary positioning element (16), the rotating positioning element (15), the pivot pin bracket (14) and the limit disk (12) on the combination shaft (113).

Figure 3:
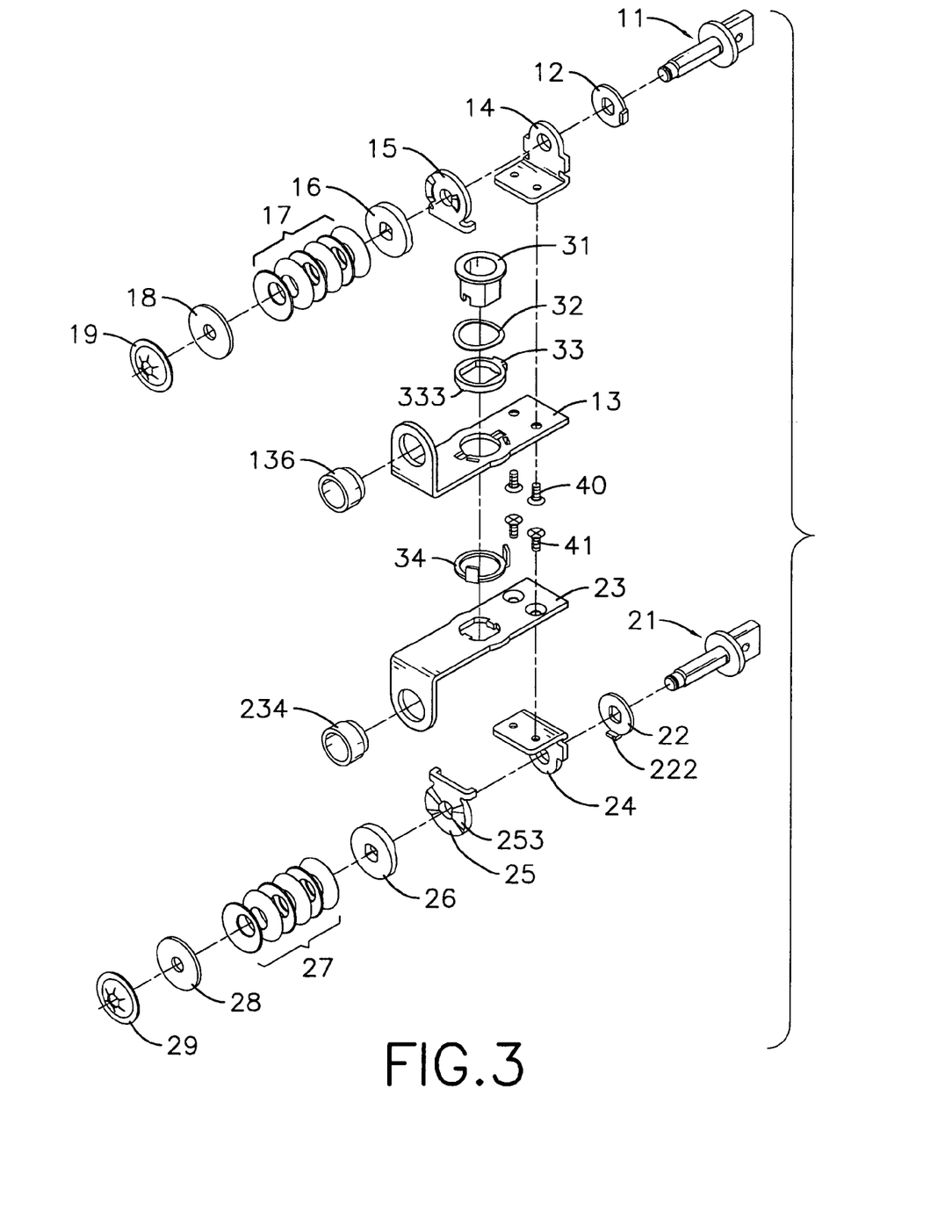
FIG. 3 is an exploded perspective view of the hinge in FIG. 1.

The offset hinge (20) is mounted in the base (60), is used to pivot the cover (50) until the outside surface of the cover (50) abuts the bottom surface of the base (60) and comprises a keyed pivot pin (21), an optional limit disk (22), a pivot pin bracket (24), an offset hinge bracket (23), a rotating positioning element (25), a stationary positioning element (26), a biasing assembly (27), an optional washer (28) and a fastener (29).

The keyed pivot pin (21) is mounted in the base (60) and has an outside end, an inside end, a head (212), a combination shaft (213) and a flange (211). The head (212) is formed on the outside end. The combination shaft (213) is formed on the inside end coaxially with the head (212). The flange (211) is formed between the head (212) and the combination shaft (213).

With further reference to FIG. 3, the limit disk (22) is mounted around the combination shaft (213), abuts the flange (211) and has an outer edge, a central keyhole (221) and a positive stop (222). The positive stop (222) is formed on the outer edge.

The pivot pin bracket (24) is L-shaped, is mounted around the combination shaft (211), abuts the limit disk (22) and has a transverse leg, a longitudinal leg, two optional positive stops (241), two optional notches (242), a central circular hole (243) and two optional fastening holes (244). The transverse leg has an outer edge. The positive stops (241) are formed on the outer edge of the transverse leg diametrically opposite to each other, and abut the positive stop (222) on the limit disk (22) to keep the keyed pivot pin (21) from pivoting further. The notches (242) are formed between the positive stops (241) and the longitudinal leg. The central circular hole (243) is formed in the transverse leg. The fastening holes (244) are formed in the longitudinal leg.

The offset hinge bracket (23) is L-shaped, is attached to the pivot pin bracket (24) and has a longitudinal leg, a transverse leg, a keyhole (231), two keys (232), a mounting hole (233), a rotating element (234) and two optional fastening holes (235). The keyhole (231) is formed in the longitudinal leg and has an inner edge. The keys (232) are formed diametrically opposite to each other on the inner edge of the keyhole (231). The mounting hole (233) is formed in the transverse leg. The rotating element (234) is mounted in the mounting hole (233) and is mounted rotatably in the base (60). The fastening holes (235) are formed in the longitudinal leg so the fastening elements (41) can pass through the fastening holes (235, 244) and attach the offset hinge bracket (23) to the pivot pin bracket (24).

The rotating positioning element (25) is mounted rotatably around the combination shaft (213), abuts the transverse leg of the pivot pin bracket (24) and has an outer edge, an outside surface, an inside surface, a central circular hole (251), two optional mounting tabs (252) and two protrusions (253). The outside surface abuts the transverse leg of the pivot pin bracket (24). The mounting tabs (252) are formed on the outer edge of the rotating positioning element (25) of the offset hinge (20) and correspond to and are mounted respectively in the notches (242). The protrusions (253) are symmetrical, are formed concentrically and diametrically opposite to each other on the inside surface around the central circular hole (251) and have inclined ends.

The stationary positioning element (26) is mounted on the combination shaft (213), abuts the inside surface of the rotating positioning element (25) and has an inside surface, an outside surface, a central keyhole (261) and two detents (262). The detents (262) are formed on the inside surface of the stationary positioning element (26) and correspond to the protrusions (253) on the rotating positioning element (25).

The biasing assembly (27) is mounted rotatably around the combination shaft (213), abuts the outside surface of the stationary positioning element (26) and has a central hole (271).

The washer (28) is mounted around the combination shaft (213), abuts the biasing assembly (27) and has a central hole (281).

The fastener (29) is attached to the combination shaft (213), sequentially holds the washer (28), the biasing assembly (27), the stationary positioning element (26), the rotating positioning element (25), the pivot pin bracket (24) and the limit disk (22) on the combination shaft (213).

The turning hinge (30) is mounted in the tilt hinge bracket (13) and the offset hinge bracket (23), is used to turn the cover (50) from side to side and comprises a rotating positioning element (34), a stationary positioning element (33), a biasing member (32) and a keyed pivot pin (31).

The rotating positioning element (34) is attached to the outside surface of the tilt hinge bracket (13) and the longitudinal leg of the offset hinge bracket (23) and has an outer edge, a central hole (341), a first protruding limit (342) and a second protruding limit (343). The first and second protruding limits (342, 343) are formed on the outer edge of the rotating positioning element (34) of the turning hinge (30) and pass respectively through the keyholes (132) in the tilt hinge bracket (13).

The stationary positioning element (33) is attached to the inside surface of the tilt hinge bracket (13) and has an outer edge, an outside surface, an inside surface, a central keyed hole (331), a positive stop (332) and a retainer (333). The inside surface of the stationary element (33) of the turning hinge (30) abuts the inside surface of the tilt hinge bracket (13) of the tilt hinge (10). The positive stop (332) is formed on the outer edge of the stationary positioning element (33) and selectively abuts the first and second protruding limits (342, 343) on the rotating positioning element (34) of the turning hinge (30). The retainer (333) is formed on the inside surface at the outer edge of the stationary positioning element (33) of the turning hinge (30) and selectively engages in the first and second detents (132, 133).

The biasing member (32) presses against the outside surface of the stationary positioning element (33) and has a central hole (321).

The keyed pivot pin (31) passes sequentially through the biasing member (32), the stationary positioning element (33), the through hole (131) in the tilt hinge bracket (13), the rotating positioning element (34) and the keyhole (231) in the offset hinge bracket (23) and has a distal end, a proximal end, a flange (312) and two notches (311). The flange (312) is formed around the distal end of the keyed pivot pin (31) and holds the biasing member (32) securely against the stationary positioning element (33). The notches (311) are formed diametrically opposite to each other in the proximal end of the keyed pivot pin (31) and are attached to the keys (232) in the keyhole (231) in the offset hinge bracket (23).

Figure 7:
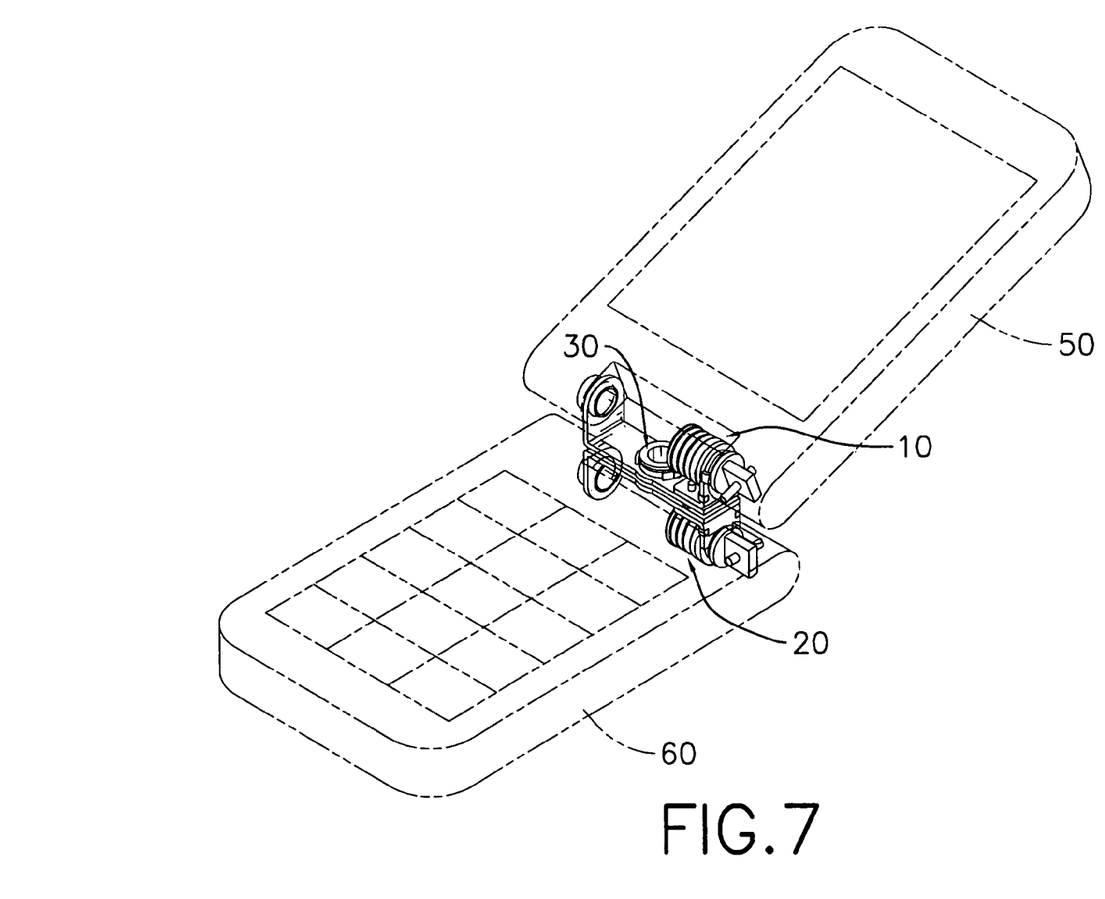
FIG. 7 is an operational perspective view of the cellular phone in FIG. 6 with the cover open.

With further reference to FIG. 7, the cover (50) is opened by pivoting the tilt hinge (10). Because the limit disk (12) of the tilt hinge (10) and the stationary positioning element (16) of the tilt hinge (10) are keyed on the keyed pivot pin (11) of the tilt hinge (10), the keyed pivot pin (11) will rotate the limit disk (12) and the stationary positioning element (16). When the cover (50) is pivoted to a predetermined visual angle, the first and second protrusions (153, 154) on the rotating positioning element (15) of the tilt hinge (10) are held respectively in the third and forth detents (164, 165) of the stationary positioning element (16). The engagement of the protrusions (153, 154) of the rotating positioning element (15) and the detents (164, 165) of the stationary positioning element (16) keeps the cover (50) opened to the predetermined visual angle.

When the cover (50) is closed by rotating the keyed pivot pin (11) of tilt hinge (10), the first and second protrusions (153, 154) on the rotating positioning element (15) engage and are held respectively in the first and second detents (162, 163) in the stationary positioning element (16). The engagement of the protrusions (153, 154) on the rotating positioning element (15) and the detents (162, 163) in the stationary positioning element (16) keeps the cover (50) from hitting the base (60).

Figure 8:
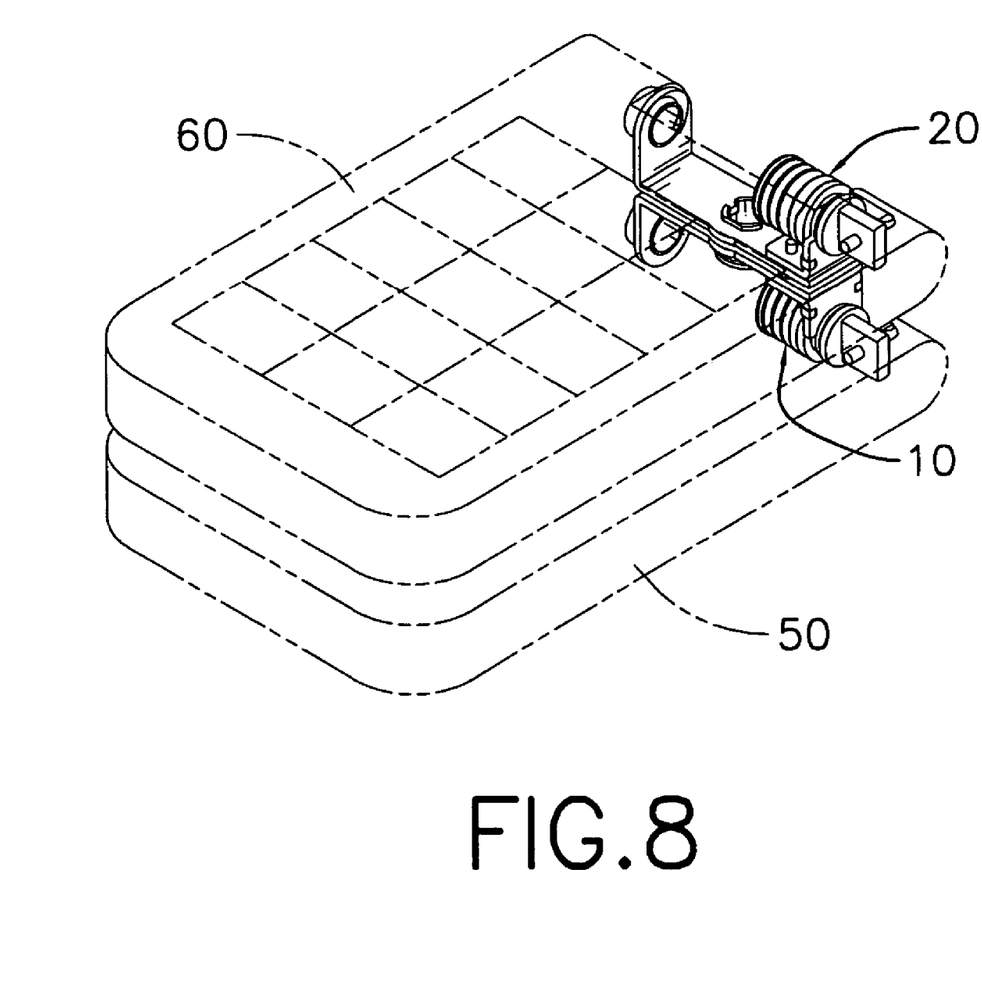
FIG. 8 is an operational perspective view of the cellular phone in FIG. 6 with the cover closed.

With further reference to FIG. 8, the cover (50) is pivoted beyond the angle where the positive stop (122) on the limit disk (12) of the tilt hinge (10) engages the positive stop (141) on the pivot pin bracket (14). This forces the protrusions (253) on the rotating positioning element (25) of the offset hinge (20) to disengage from the detents (262) on the stationary positioning element (26). The cover (50) and the offset hinge (20) are pivoted until the cover (50) is parallel with the base (60). When the cover (50) is parallel with the base (60), the protrusions (253) on the rotating positioning element (25) of the offset hinge (20) are held respectively in the detents (262) in the stationary positioning elements (26) of the offset hinge (20). The engagement of the protrusions (253) and the detents (262) hold the cover (50) in place.

Figure 9:
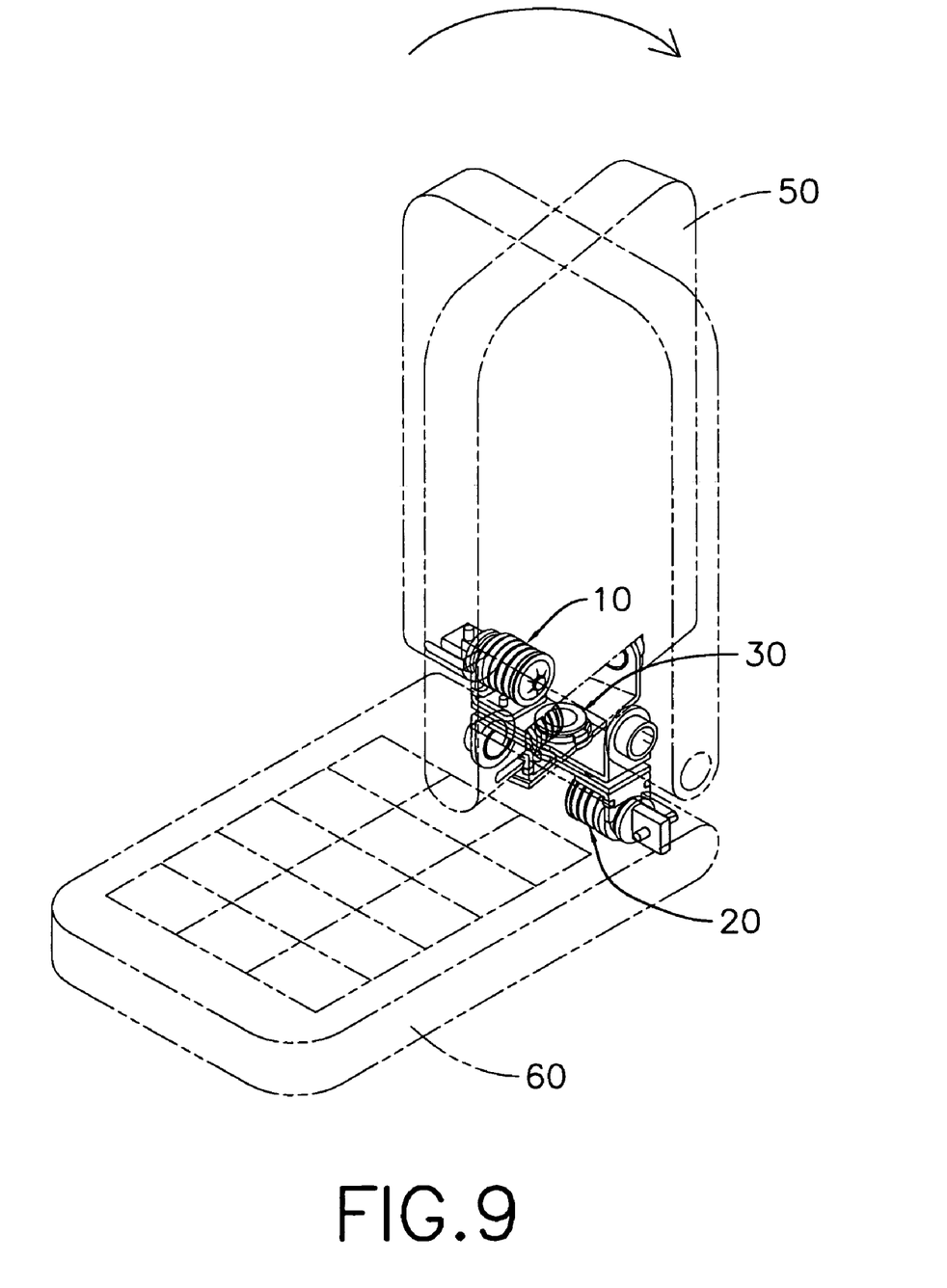
FIG. 9 is an operational perspective view of the cellular phone in FIG. 6 with the cover open and pivoted to the left.

With further reference to FIG. 9, the cover (50) is turned left or right by rotating the turning hinge (30) when cover (50) has been opened from 90° to 270° by pivoting the tilting hinge (10) or the tilting hinge (10) and the offset hinge (20). Because the stationary positioning element (33) of the turning hinge (30) and the offset hinge bracket (23) of the offset hinge (20) are keyed on the keyed pivot pin (31) of the turning hinge (30), the keyed pivot pin (31) will keep the stationary positioning element (33) from rotating. Because the first and second protruding limits (342, 343) of the rotating positioning element (34) of the turning hinge (30) pass respectively through the keyholes (132) in the tilt hinge bracket (13), the rotating positioning element (34) turns with the tilt hinge bracket (13). When the rotating positioning element (34) of the turning hinge (30) is turned, the first and second protruding limits (342, 343) of the rotating positioning element (34) of the turning hinge (30) will selectively abut the positive stop (332) on the stationary positioning element (33) of the turning hinge (30), and the retainer (333) on the stationary positioning element (33) (30) will selectively engage the detents (133) in the tilt hinge bracket (13). The first and second protruding limits (342, 343) abutting the positive stop (332) on the stationary positioning element (33) will limit the angle that the cover (50) can be turned. The engagement of the retainer (333) of the stationary positioning element (33) of the turning hinge (30) and the detents (133) in the tilt hinge bracket (13) will hold the cover (50) in place.

The hinge with orthogonal pivots has numerous advantages. The cover (50) not only can be opened and closed, but can be turned to many visual angles. With the rotating of the turning hinge (30), a cellular phone with a camera can be turned to take pictures of the user, and the user still can see the keyboard on the base (60). The positioning of the tilt, offset and turning hinges (10, 20, 30) will keep the cover (50) from over turning.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge with orthogonal pivot axes for being used with a cellular phone having a cover with a display and an outside surface and a base with a bottom surface, the hinge comprising a tilt hinge adapted to be mounted in the cover and comprising
- a keyed pivot pin adapted to be mounted in the cover and having
  - an outside end;
  - an inside end;
  - a head formed on the outside end;
  - a combination shaft formed on the inside end and coaxially with the head; and
  - a flange formed between the head and the combination shaft;
- a pivot pin bracket being L-shaped, mounted around the combination shaft and having
  - a transverse leg with an outer edge;
  - a longitudinal leg; and
  - a central circular hole formed in the transverse leg;
- a tilt hinge bracket being L-shaped, attached to the pivot pin bracket and having
  - a transverse leg;
  - a longitudinal leg with an inside surface and an outside surface;
  - a through hole formed in the longitudinal leg;
  - two keyholes formed around the through hole;
  - two detents are formed diametrically opposite to each other in the inside surface of the longitudinal leg around the through hole;
  - a mounting hole formed in the transverse leg; and
  - a rotating element mounted in the mounting hole and adapted to be mounted rotatably in the cover;
- a rotating positioning element mounted around the combination shaft, abutting the transverse leg of the pivot pin bracket and having
  - an outer edge;
  - an outside surface abutting the transverse leg of the pivot pin bracket;
  - an inside surface;
  - a central circular hole with a center;
  - a first protrusion formed in the inside surface around the central circular hole and having two inclined ends and a distance from the center of the central circular hole; and
  - a second protrusion formed in the inside surface around the central circular hole and having two inclined ends and a distance from the center of the central circular hole wherein the first and second protrusions are concentric and are dissymmetrical with each other;
- a stationary positioning element mounted on the combination shaft, abutting the inside surface of the rotating positioning element and having
  - an inside surface;
  - an outside surface;
  - a central keyed hole;
  - a first detent formed around the central keyed hole and selectively corresponding to the first protrusion on the rotating positioning element;
  - a second detent formed around the central keyed hole and selectively corresponding to the second protrusion on the rotating positioning element wherein the first and second detents are formed to simultaneously engage the first and second protrusions when the cover is open;
  - a third detent formed around the central keyed hole and selectively corresponding to the first protrusion on the rotating positioning element; and
  - a forth detent formed around the central keyed hole and selectively corresponding to the second protrusion on the rotating positioning element wherein the third and forth detents are formed to simultaneously engage the first and second protrusions when the cover is closed;
- a biasing assembly mounted around the combination shaft, abutting the outside surface of the stationary positioning element and having a central hole; and
- a fastener attached to the combination shaft, sequentially holding the biasing assembly, the stationary positioning element, the rotating positioning element and the pivot pin bracket on the combination shaft;

an offset hinge adapted to be mounted in the base and comprising
- a keyed pivot pin adapted to be mounted in the cover and having
  - an outside end;
  - an inside end;
  - a head formed on the outside end;
  - a combination shaft formed on the inside end coaxially with the head; and
  - a flange formed between the head and the combination shaft;
- a pivot pin bracket being L-shaped, mounted around the combination shaft and having
  - a transverse leg with an outer edge;
  - a longitudinal leg; and
  - a central circular hole formed in the transverse leg;
- an offset hinge bracket being L-shaped, attached to the pivot pin bracket and having
  - a longitudinal leg;
  - a transverse leg;
  - a keyhole formed in the longitudinal leg of the offset hinge bracket and having an inner edge;
  - two keys formed diametrically opposite to each other on the inner edge of the keyhole;
  - a mounting hole formed in the transverse leg; and
  - a rotating element mounted in the mounting hole and adapted to be mounted rotatably in the base;
- the rotating positioning element mounted rotatably around the combination shaft, abutting the transverse leg of the pivot pin bracket and having
  - an outer edge;
  - an outside surface abutting the transverse leg of the pivot pin bracket;
  - an inside surface;
  - a central circular hole; and
  - two protrusions being symmetrical, formed concentrically and diametrically opposite to each other on the inside surface around the central circular hole and having inclined ends;

a stationary positioning element mounted on the combination shaft, abutting the inside surface of the rotating positioning element and having
an inside surface;
an outside surface;
a central keyhole; and
two detents formed on the inside surface of the stationary positioning element of the offset hinge and corresponding to the protrusions on the rotating positioning element;
a biasing assembly mounted rotatably around the combination shaft, abutting the outside surface of the stationary positioning element and having a central hole; and
a fastener attached to the combination shaft, sequentially holding the biasing assembly, the stationary positioning element, the rotating positioning element and the pivot pin bracket on the combination shaft;
a turning hinge mounted in the pivot pin brackets of the tilt and offset hinges and comprising
a rotating positioning element attached to the outside surface of the tilt hinge bracket and the longitudinal leg of the offset hinge bracket and having
an outer edge;
a central hole;
a first protruding limit formed on the edge of the rotating positioning element of the turning hinge and passing through one of the keyholes in the tilt hinge bracket; and
a second protruding limit formed on the outer edge of the rotating positioning element and passing through the other keyhole in the tilt hinge bracket;
a stationary positioning element attached to the inside surface of the tilt hinge bracket and having
an outer edge;
an outside surface;
an inside surface abutting the inside surface of the tilt hinge bracket;
a central keyed hole;
a positive stop formed on the outer edge of the stationary positioning element and selectively abutting the first and second protruding limits on the rotating positioning element of the turning hinge; and
a retainer formed on the inside surface at the outer edge of the stationary positioning element of the turning hinge and selectively engaging in the first and second detents;
a biasing member pressing against the outside surface of the stationary positioning element and having a central hole;
a keyed pivot pin passing sequentially through the biasing member, the stationary positioning element of the turning hinge, the through hole in the tilt hinge bracket, the rotating positioning element of the turning hinge and the keyhole in the offset hinge bracket and having a distal end;
a proximal end;
a flange formed around the distal end and holding the biasing member securely against the stationary positioning element; and
two notches formed diametrically opposite to each other in the proximal end of the keyed pivot pin of the turning hinge and attached to the keys in the keyhole in the offset hinge bracket.

2. The hinge as claimed in claim 1, wherein
the distance between the first protrusion on the rotating positioning element of the tilt hinge and the center of the central circular hole is different from the distance between the second protrusion and the center of the central circular hole.

3. The hinge as claimed in claim 1, wherein
the tilt and offset hinge further comprise respectively limit disks mounted respectively around the combination shafts, abutting the flanges on the keyed pivot pins and having
an outer edge;
a central keyhole; and
a positive stop formed on the outer edge;
the pivot pin brackets of the tilt and offset hinge respectively further comprise two positive stops formed respectively on the outer edge of the transverse leg of the pivot pin brackets diametrically opposite to each other, wherein the positive stops on the limit disks selectively abut respectively the positive stops on the pivot pin brackets.

4. The hinge as claimed in claim 3, wherein
the pivot pin brackets of the tilt and offset hinges respectively further comprises two notches formed between the positive stops and the longitudinal leg of the pivot pin brackets; and
the rotating positioning elements of the tilt and offset hinges respectively further comprises two mounting tabs formed respectively on the outer edge of the rotating positioning element and corresponding to the notches the pivot pin brackets.

5. The hinge as claimed in claim 1, wherein
the tilt and offset hinges further comprise respectively washers mounted respectively around the combination shafts, abutting the biasing assemblies and having central holes.

6. The hinge as claimed in claim 1, wherein
the pivot pin brackets of the tilt and offset hinges respectively further comprises two fastening holes formed in the longitudinal leg;
the stationary leafs of the tilt and offset hinges respectively further comprises two fastening holes formed in the longitudinal leg; and
four fastening elements pass respectively through the fastening holes of the pivot pin brackets and the tilt and offset hinge brackets to hold the tilt and offset hinge brackets and the pivot pin brackets together.

* * * * *